Oct. 21, 1958   J. L. McTAGGART ET AL   2,857,176
TUBE COUPLING WITH NUT-ACTUATED CLAMPING AND SEALING MEANS
Filed Feb. 6, 1956
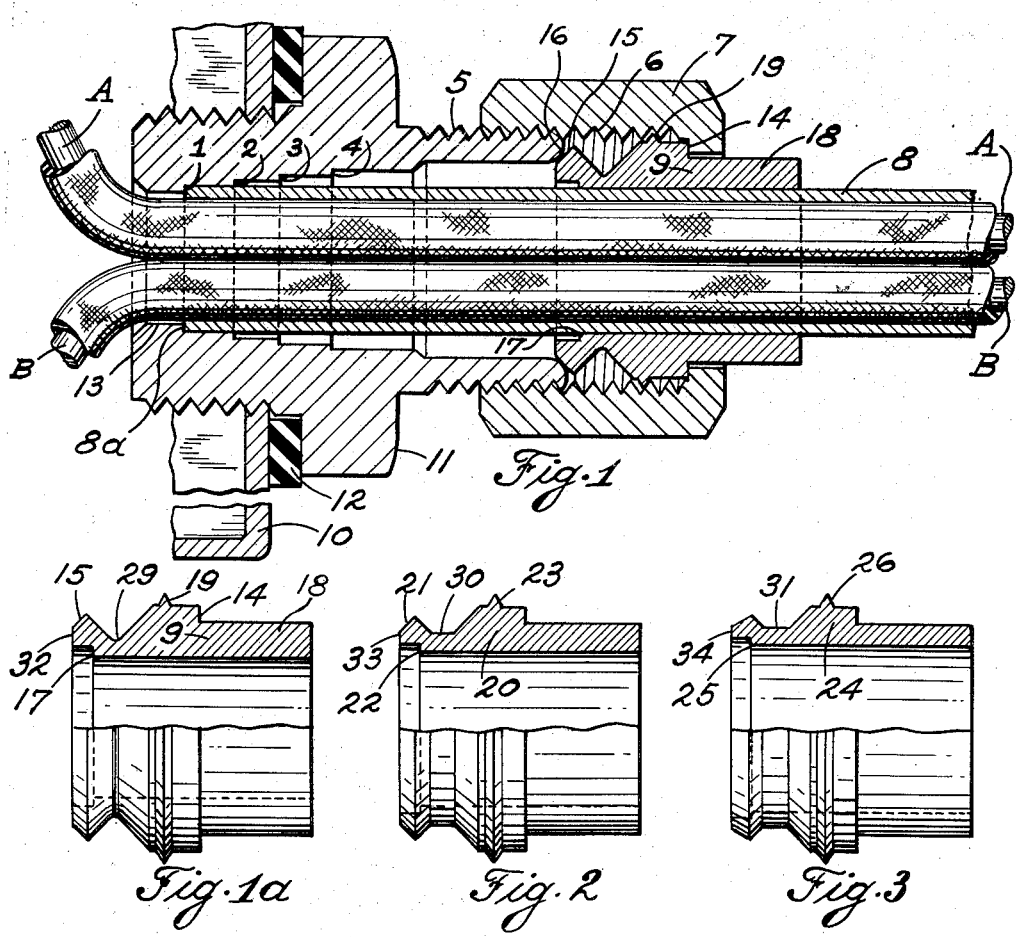
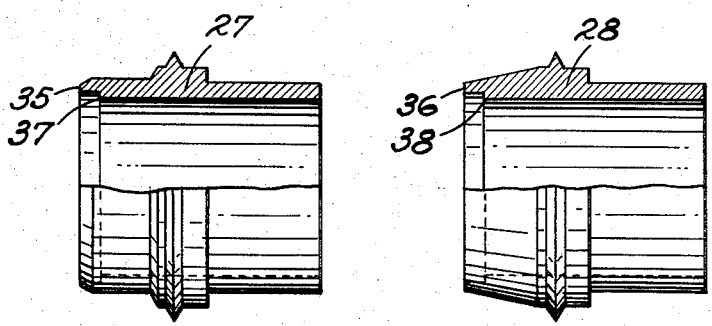
INVENTORS
JACKSON L. McTAGGART
& JOSEPH VELLA.
BY
RICHEY, WATTS, EDGERTON & McNENNY
ATTORNEYS United States Patent Office 2,857,176
Patented Oct. 21, 1958

2,857,176

TUBE COUPLING WITH NUT-ACTUATED CLAMPING AND SEALING MEANS

Jackson L. McTaggart and Joseph Vella, St. Thomas, Ontario, Canada, assignors to The Weatherhead Company, Cleveland, Ohio, a corporation of Ohio Application February 6, 1956, Serial No. 563,786

1 Claim. (Cl. 285—158)

This invention relates to a connector means having a multiple shoulder connector body adaptable for connecting sheathed electrical conduit, tubing, and the like.

Prior art tube coupling devices comprise a body and nut and a sleeve member, where upon tightening of the nut the sleeve is deformed against the body, and a cutting edge on the sleeve shears a seat on the tube or sheathed conduit to form a holding and sealing means.

It can be readily seen that it would be advantageous to provide a connector body capable of receiving a plurality of sheathed conduit sizes.

It is an object of our invention to provide a multiple shoulder connector body adapted to receive a predetermined number of conduit sizes, so that it is only necessary to apply a different sleeve with each sheathed conduit size. The body and the nut remain the same for the various sizes.

An object of our invention is to provide a coupling arrangement, easily manufacturable and capable of coupling various tube sizes by selecting the proper sleeve size for the tube, but utilizing the same multiple shoulder body and nut.

A further object of our invention is to provide a coupling for use as a vapor and moisture-proof electrical conduit fitting.

Another object of our invention is to provide a multiple shoulder body to receive various sizes of sheathed electrical conduit, which fitting can be tightly made by the selection of the proper sleeve for each conduit size.

Another object of our invention is to provide the sleeve member with a means for loosely securing it to a nut prior to assembly with the body.

In the particular embodiment of our invention we show a multiple shoulder body capable of receiving aluminum sheathed electrical conduit having the following outside diameters: .390"; .420"; .435"; and .465".

In the drawings:

Fig. 1 is an enlarged sectional view of an assembled connector;

Fig. 1a is a partial section of the sleeve shown in Fig. 1;

Fig. 2 is a partial section of another sleeve member for use with conduit having a larger outside diameter;

Fig. 3 is a partial section of another sleeve for conduit having a yet larger outside diameter;

Fig. 4 is a partial section of another sleeve for conduit having the largest outside diameter to be used in the connector body; and Fig. 5 is a partial section of yet another sleeve for the conduit having the largest outside diameter.

A portion of an electrical outlet box 10 is shown in Fig. 1, with the multiple shoulder body 11 threaded therein and having a washer 12 of resilient material for sealing the body in conjunction with the electrical outlet box. Although this is the preferred embodiment, it is obvious that the body could be used in the absence of the electrical outlet box.

The body 11 is provided with a longitudinal opening extending through the body and having an aperture 13 and annular multiple shoulders 1, 2, 3 and 4. The body is provided with threads 5 to receive threads 6 of nut 7.

In Fig. 1, a sheathed conduit 8, with conductors A and B, is shown inserted within body 11 and extending therethrough until the end 8a of conduit 8 butts against shoulder 1. As is apparent from Fig. 1, conduit 8, as shown, represents the smallest outside diameter sheathed conduit adapted to be received within body 11. It follows that a slightly larger conduit (not shown) would be butted against shoulder 2 and a still larger conduit would butt against shoulder 3, etc.

For each size conduit, however, a different sleeve would have to be provided as set out below.

A sleeve 9 is shown inserted within nut 7 and around conduit 8. The inside diameter of the sleeve corresponds to the outside diameter of the conduit 8.

The nut 7 contacts sleeve 9 at face 14, so that when the nut is drawn up on threads 5 the sleeve is forced to the left as viewed in Fig. 1.

An annular inclined face 15 of sleeve 9 engages an annular opening 16 in body 11. As the sleeve 9 is forced to the left the inclined face 15 is positioned downwardly in relation to annular opening 16 thus causing annular cutting edge 17 of sleeve 9 to dig into the sheathed conduit 8 around its periphery. This action causes the conduit 8 to be gripped tightly by sleeve 9 and, at the same time, forms a sealing engagement where edge 17 has cut into the sheath of the conduit. Extension portion 18 of sleeve 9 is readily visible after assembly, and upon visual inspection indicates that the conduit has been properly affixed within body 11.

Additionally, an annular bead 19 is shown integral with sleeve 9. This bead has an outside diameter slightly larger than the inside diameter of threads 6 of nut 7. Thus sleeve 9 can be loosely threaded into the nut 7 to prevent the sleeve from falling out of the nut during handling prior to assembly with body 11.

Fig. 2 shows a sleeve 20 having an inclined annular face 21 and an annular cutting edge 22. The inside diameter of sleeve 20 is such that it will allow a sheathed conduit to pass therethrough of a size adapted to butt against shoulder 2 of body 11 in Fig. 1. The sleeve 20, of course, would be positioned in relation to body 11 as was described in conjunction with sleeve 9. The drawing up of nut 7 would force cutting edge 22 into the sheathed conduit. An annular bead 23 performs the same function as was described in connection with bead 19.

Fig. 3 discloses a sleeve 24 adapted to receive a larger sheathed conduit therethrough when assembled as in Fig. 1, so that the end of the conduit butts against shoulder 3. Upon tightening of nut 7, the cutting edge 25 of the sleeve is sheared into the sheath to form a sealing and holding engagement of the sleeve with the conduit, and with body 11. An annular bead 26 performs the same function as beads 19 and 23 on the hereinbefore described sleeves.

Figs. 4 and 5 disclose sleeves 27 and 28 being provided with an inside diameter such as to allow a sheathed conduit to pass therethrough when assembled as in Fig. 1, so that the conduit will butt against shoulder 4. The tightening of nut 7 will cause the cutting edge of the sleeve to dig into the sheath as heretofore described.

The various annular grooves 29, 30 and 31 of Figs. 1, 2 and 3 are to assist in allowing the respective cutting edges 17, 22 and 25 to dig into the appropriately sized conduits. Sleeve 9, having a smaller inside diameter at face 32, requires the most accentuated groove 29. The grooves 30 and 31 are elongated longitudinally as the respective faces 33 and 34 obtain larger inside diameters.

Figs. 4 and 5, having faces 35 and 36, have the larger inside diameter and require no annular grooving to set their respective cutting edges 37 and 38.

Thus we have described a simple connecting arrangement whereby an identical sized body and nut may be used for a plurality of sheathed conduits or tubes, and to accomplish the proper connection it is only necessary to provide a properly sized sleeve for use in conjunction with the particular sheathed conduit or tube selected. This allows a simple stocking of similar bodies and nuts and requires only the stocking of various sleeve sizes.

In addition, it should be noted that with the provision of washer 12 of Fig. 1 and the engagement of the cutting edge of the sleeve selected with the conduit used form an effective sealing means in making the connection with the electrical outlet box explosion-proof.

The various forms of sleeve have been described to be used in common with the single showing of the multiple shoulder body and nut.

Although the foregoing description is necessarily of a detailed character, in order that the invention may be completely set forth, it is to be understood that the specific terminology is not intended to be restrictive or confining, and that various rearrangements of parts and modifications of detail may be resorted to without departing from the scope or spirit of the invention as herein claimed.

What is claimed is:

A connector for electrical conduit comprising a body having one end thereof exteriorly threaded for connection to an outlet box and the other end thereof exteriorly threaded to receive a clamping nut, said body having an axial bore therethrough formed of cylindrical bore portions of different diameters, said one end of said body having the minimum diameter cylindrical bore portion to receive electrical cable carried by the conduit, the other end of said body having the maximum diameter cylindrical bore portion to receive the forward end of a cutting ring, said cylindrical bore portions including a series of portions progressively decreasing in diameter from said ring receiving bore portion to said minimum bore portion, a cutting ring having an inner diameter corresponding to the outer diameter of the conduit received in one of said series of cylindrical bore portions, said cutting ring having a counter-bore at its forward end to provide a cutting edge at the inner diameter of the ring, the exterior of said ring adjacent said counter-bore having a conical face, the entrance of said maximum diameter bore portion having a chamfered edge to cooperate with the conical face on the ring to effect reduction in diameter of the ring at its forward end, said ring having an annular groove at the exterior thereof adjacent said conical face, one side of said groove terminating in a cylindrical shoulder having an annular bead, said ring having a cylindrical section extending rearwardly from said shoulder, a clamping nut interiorly threaded to receive the external threads of said other end of the bore portion, said nut having a flange extending radially inward to engage a radial wall on said ring shoulder, said flange terminating in an opening slightly larger than the outer diameter of the cylindrical portion of the ring, the outer diameter of the bead exceeding the crest diameter but less than the root diameter of the threads on the nut, whereby said nut and ring may be assembled by interengagement of the threads on the nut and the bead on the ring prior to assembly on the conduit and whereby when said nut is drawn up on the body the forward end of the ring is reduced in diameter and the diameter reduction is limited by the cylindrical bore section receiving the forward end of the ring.

References Cited in the file of this patent

UNITED STATES PATENTS

| | | |
|---|---|---|
| 1,684,582 | Hoaglund | Sept. 18, 1928 |
| 1,797,277 | Thomas | Mar. 24, 1931 |
| 2,536,745 | Herold | Jan. 2, 1951 |

FOREIGN PATENTS

| | | |
|---|---|---|
| 530,177 | Germany | July 23, 1931 |
| 564,182 | Great Britain | Sept. 15, 1944 |